March 17, 1959

H. T. RUTHERFORD 2,877,671

BEARING BORING MACHINE

Filed June 23, 1955

INVENTOR
HARRY T. RUTHERFORD

BY J. Wesley Everett
ATTORNEY

INVENTOR
HARRY T. RUTHERFORD

March 17, 1959 H. T. RUTHERFORD 2,877,671
BEARING BORING MACHINE
Filed June 23, 1955 6 Sheets-Sheet 3

Inventor
HARRY T. RUTHERFORD
J. Wesley Everett
Attorney

March 17, 1959

H. T. RUTHERFORD 2,877,671

BEARING BORING MACHINE

Filed June 23, 1955

Inventor

HARRY T. RUTHERFORD

By *J Wesley Everett*

Attorney

March 17, 1959     H. T. RUTHERFORD     2,877,671
BEARING BORING MACHINE

Filed June 23, 1955     6 Sheets-Sheet 6

INVENTOR
HARRY T. RUTHERFORD
BY *J. Wesley Everett*
ATTORNEY

United States Patent Office 2,877,671
Patented Mar. 17, 1959

2,877,671

BEARING BORING MACHINE

Harry T. Rutherford, Baltimore, Md.

Application June 23, 1955, Serial No. 517,508

3 Claims. (Cl. 77—3)

The present invention relates to boring machines and in particular to an improvement in machines for boring pistons and connecting rod bearings. However, the machine is not limited to this specific operation.

Most machines designed for this work are too elaborate for the smaller shop, many requiring special micrometer gauges and other accessories which place the apparatus out of reach of the moderate repair shop.

The primary object of the invention is to provide a boring machine of this character which may be economical to produce and simple in its operation.

Another object of the invention is to provide means where a more practical method may be used in setting up the machine to do a particular boring operation on the piston, connecting rod bearing, or other work pieces.

Still another object of the invention is to provide a machine in which all measurements are taken and the boring operations are carried out in relation to the rotating axis of a driving head.

A further object of the invention is to provide a machine which will bore both the piston and connecting rod bearing with equal efficiency and with a minimum of set-up time.

A still further object of the invention is to provide a machine which when once set may be used to bore any number of both piston and connecting rod bearings without any readjustment of the tool.

Still a further object of the invention is to provide an improved method of setting up the cutting tool for boring piston and connecting rod bearings.

Still further, another object of the invention is to provide means whereby the measurement for setting the cutting tool is taken directly from the wrist-pin occupying the same position in the rotating head as the boring tool supporting spindle.

While several objects of the invention have been pointed out, its uses and advantages will become more apparent as the nature of the invention is more fully disclosed, which consists in its novel construction, combination and arrangement of its several parts as described in the following detail description and illustrated in the accompanying drawing, in which.

In referring to the drawings like character references are used to designate like and similar parts throughout the several views. Certain parts of the machine are illustrated schematically in several of the views in order to not crowd the more essential parts which are in full lines.

Figure 1:
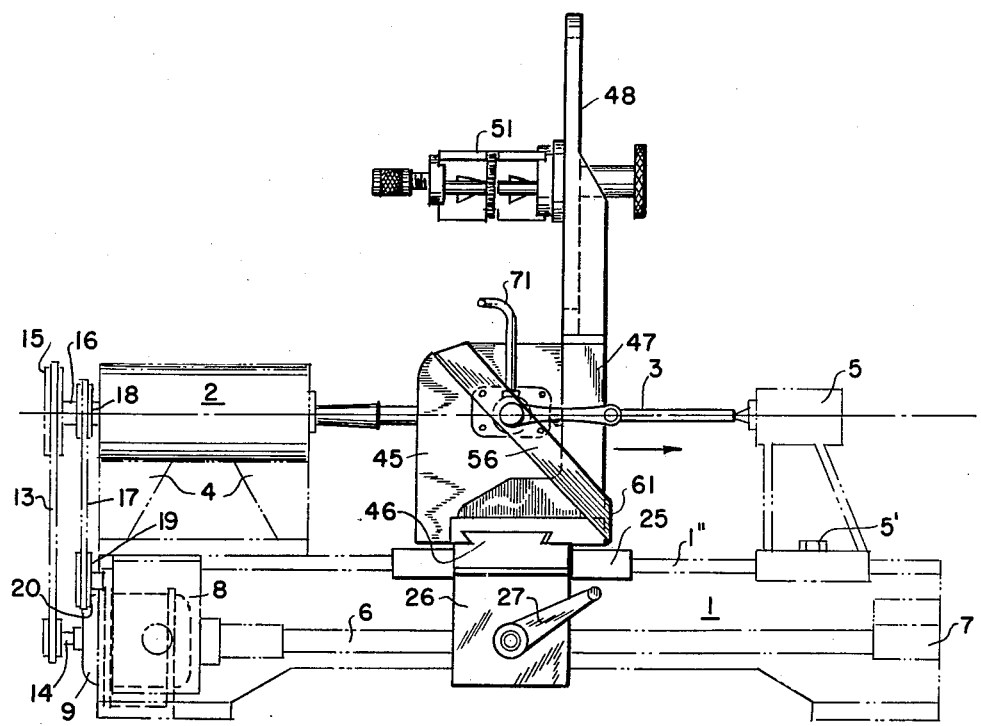
Figure 1 is a view in elevation of the machine.

The machine comprises a bed or base 1 having a rotatable tool driving head rotatably supported within the housing 2 for rotating a spindle 3 in which a boring tool is carried. The base is provided with a track, or guideway 1' adjacent its upper surface. The track or guideway is in a plane parallel with the axis of the rotatable head. The driving head is supported upwardly and in an offset position from the plane of the bed of the machine on suitable supports 4. Adjacent the opposite end of the frame is a tail-stock 5, or support for the outer end of the tool carrying spindle 3. The outer support 5 is usually slidably mounted on the guideway 1', that is, the member may be slid along the guideway 1' and then fixed in whatever location is desirable by a suitable screw 5'. Further, the machine is provided with a rotatable threaded feed screw 6, which extends substantially the full length of the machine and is located on the right side of the machine looking from the driving head toward the tail-stock 5. One end of the feed screw is journaled in a bearing 7 and the outer end is supported and driven from a reduction gear (not shown) within the gear box 8. The driving head 2 and the gears are operated by a motor 9. The driving head is connected with the motor by the belt 13 which extends over the pulley 14 secured to the motor shaft and the pulley 15 connected with the rotating head shaft 16. The reduction gear within the gear box 8 for rotating the feed shaft 6 is operated by a belt 17 leading from a pulley 18 of the shaft 16 to the pulley 19, which is secured to the shaft 20 leading into the gear box 8. The base 1 may be supported in any convenient manner, that is, upon a bench or suitable legs (not shown).

Slidably receivable upon the track 1' of the bed is a carriage 25. This carriage is either manually or power operated. The carriage is provided with means for engaging the thread on the feed screw 6. The carriage is provided with a thread engaging element of any well known character which is carried on the inside of the plate 26. This element is thrown in and out of engagement by the lever 27, therefore, when the lever 27 is in position to disengage the engaging element from the feed screw 6 the carriage may be moved manually back and forth along the guideway by manually rotating the crank 27. When the carriage is to be fed automatically by the feed screw in boring the bearing, the carriage is first manually placed adjacent the driving head 2 to a point where the cutting tool is slightly beyond the bearing adjacent the tail-stock. When the work is properly set-up in the machine, the lever 27 is moved to the position for the engaging element to engage the threads on the feed screw 6, for automatically moving the carriage and clamping means containing the work over the cutting tool toward the tail stock as shown by the arrows in Figures 1 and 12.

The spindle 3 is provided with a cutting, or boring tool 37. This tool is adjustably mounted in a slot on the spindle 3 and is held in selected position by set screw 37'. The cutting tool must be set for the particular cutting operation before the bearing of the piston or other objects are clamped into the clamping unit.

The clamping unit comprises movable clamping elements 44 and 45 which are mounted on a plate 46 which is integral with and part of the carriage. Fixed to the carriage or plate 46 is a bracket 47 extending upwardly and over the clamping elements to provide a base for the member 48 which will be referred to again hereinafter. Each of the clamping elements 44 and 45 are independently mounted on the plate 46 in a dovetail slot which is securable to the plate 46 at selected locations by the screws 34 and 34' operating against a pressure plate 33. Secured to each side of the element 44 is an upper tie member 55 and a lower tie member 61, which extends past the clamping element 45 and are fastened to a plate member 56. Extending through the plate member 56 is a threaded aperture 57. Positioned inwardly from the plate 56 and in the direction of the element 44 is the clamping element 45 and fixed to the outer side of this element 45 is a housing 58. The outer end of this housing is provided wtih a small opening 59 and opposite this opening is a set screw 60 with a lock nut 66. The inner end of the housing is provided with a much larger opening 67. Within the larger inner opening there is provided a ball 68 having a stem 68' extending outwardly through an aperture 69 in the element 45. It will be noted that the aperture 69 is substantially larger than the stem 68'. In back of the ball 68 is a clamping member 70, which may be forced against the ball by a threaded arm 71 for fixing the location of the ball. The stem 68' is threadably receivable into an aperture in a face plate 45'. This face plate being mounted as it is, will pivot for a limited degree when the ball is free, but may be locked in position by tightening the screw 71.

A screw 43 is provided with a reduced end which fits within the small opening 59 in the housing. About the reduced end of screw 43 is a small recess 73 into which the end of the retaining screw 60 engages to such an extent as to allow the screw 43 to be rotated. A collar 74 is fitted adjacent the outer end of the housing as a thrust bearing between the screw 43 and the housing.

For setting the tool 37 in proper position for boring the bearing, there is provided a gauge 36 which is mounted on the outer surface of the clamping element 44 by a suitable bracket 31". The gauge is generally of the conventional type and is provided with an operating pin 36'. Opposite the operating pin 36' is an opening 31', the center of which is in line with the elongated axis of the rotatable head. Into this opening there is a slidable pin gauge 35 having one end positioned to contact one end of the gauge pin 36' and the other end positioned to contact the side of a wrist-pin which is to be fitted to the bearings.

Figure 5:
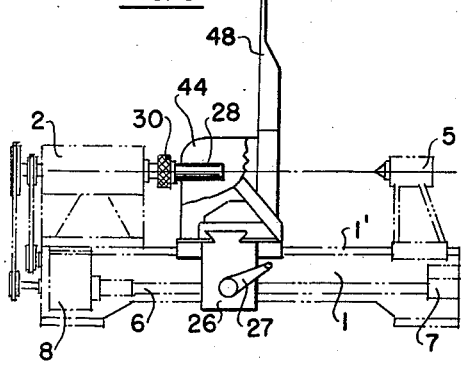
Figure 5 is a view showing schematically the arrangement of the carriage for measuring the outside diameter of a wrist-pin.

In setting the cutting tool 37, a conventional collet chuck 30 is first fastened into the rotating head in place of the spindle 3. One end of a wrist-pin 28 is placed in the chuck leaving a portion extending outwardly therefrom as shown in Figure 5. The wrist-pin has its elongated axis coinciding with the prolongated axis of the rotatable head, that is, the wrist-pin is in substantially the same position as the spindle 3 will be in when boring the bearings of the piston.

The clamping unit is next moved over the wrist-pin to a position where the gauge pin 35 is opposite the outer end of the wrist-pin, but not in contact with it. At this point the clamping element 45 is locked to the carriage by the screw 34'. By rotating the screw 43, the clamping element 44 carrying the gauge pin 35 and the gauge 36 are moved toward the wrist-pin 28. When the end 35' of the gauge pin contacts the wrist-pin and makes a recording thereon, the movement of the clamping element 44 is stopped. At this point the clamping element 44 is locked to the carriage against any further lateral movement by the screw 34. After the reading has been taken from the gauge the clamping element is then moved toward the tail stock 5 until the gauge pin is free of the wrist-pin.

Extending outwardly from the clamping elements 44 and the adjustable face plate 45' are knurled pins 80 and 81. These pins have their centers in a plane with the prolongation of the axis of the rotatable head. The pin 80 contacts the center of the piston head (during the boring of piston bearings), while the skirt of the piston abuts directly against the adjustable face plate 45'. Both the pin members 80 and 81 are used during the boring of the bearings in a smaller work piece as will be described later for boring the bearings of a connecting rod.

For holding the clamping element 44 in adjusted position on the plate 46 there is provided a set screw 34 which operates against a plate 35. For convenience in operating the screws 34 and 34' there are provided handles 34" and 34"'. When the screws 34 and 34' are loose, the jaws 44 and 45 are slidable transversely of the carriage track 1' as a unit by being tied together by the members 55 and 56 and the threaded portion 57 and the screw 43.

Figure 12:
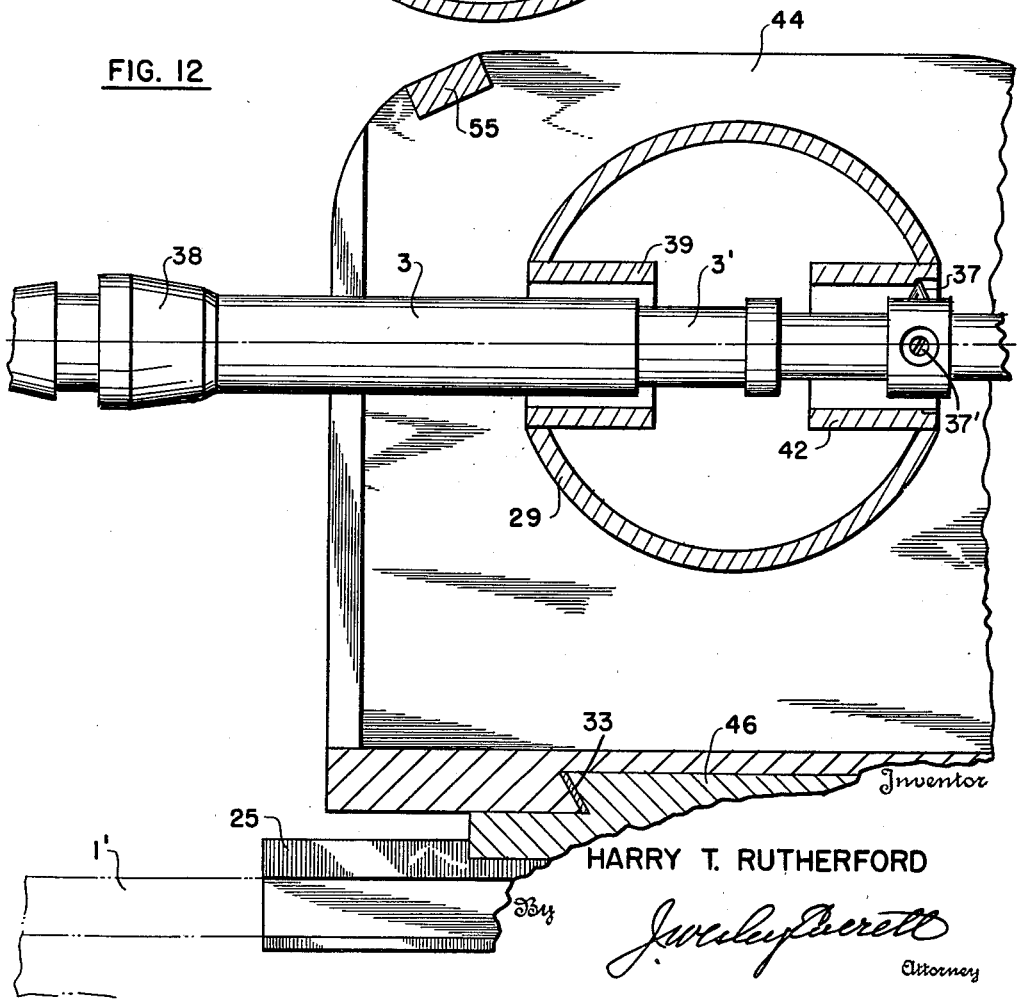
Figure 12 is an enlarged fragmentary sectional elevational view, showing the cutting tool in its initial cutting operation, as shown schematically in Figure 8.
Figure 16:
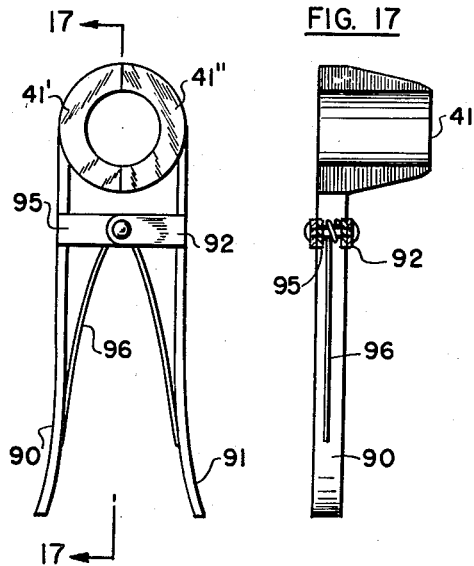
Figure 16 is an enlarged view in elevation of the removable cone position means.
Figure 17:
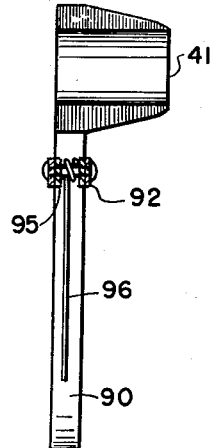
Figure 17 is an enlarged sectional view of the same taken on line 17—17 of Figure 16.
Figure 18:
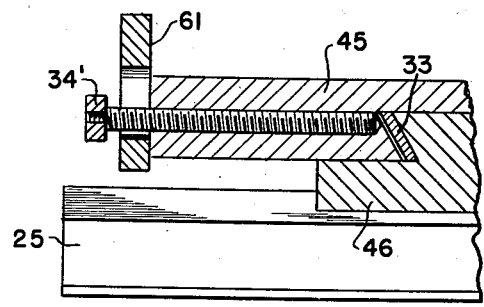
Figure 18 is a fragmentary sectional view taken on line 18—18 of Figure 3.

When work is to be clamped, such as a piston, there is provided cone members 38 and 41. Cone 38 is adapted to be slidable along the spindle 3 and cone 41 is adapted to fit within a cut-out portion 3' of the spindle, as shown in Figure 12. These cones are adapted to fit into each side of the bearing to be bored. Cone 41 is split as illustrated in Figures 16 and 17 and is opened and fitted into the recess from the cut-out portion 3' of the spindle 3. When the work has been clamped between the pin 80 carried by the clamping element 44 and the adjustable plate 45' carried by the clamping element 45, the screws 34 and 34' and the screw 71 are all tightened and the clamping jaws to the work are all held against further transverse movement.

Figure 6:
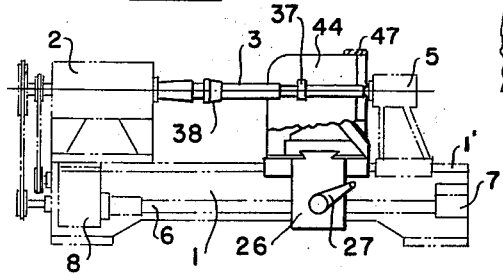
Figure 6 is a view showing schematically the position of the carriage in setting of the cutting tool.
Figure 7:
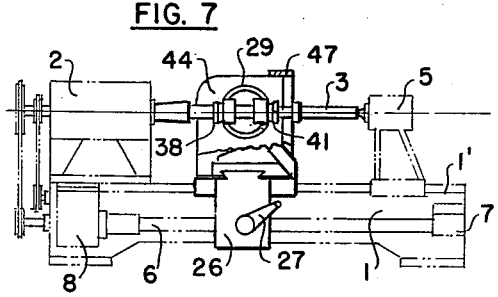
Figure 7 is a view showing schematically the tapered adjusting cones in place with the piston bearings for centering the bearings on the axis of the rotating head.

At this point the wrist-pin 28 and collet chuck 30 are removed from the rotatable head and one end of the spindle 3 carrying the cutting tool 37 is inserted within the head and its opposite end is supported by the tail-stock 5, as shown in Figure 6. The carriage is then moved along the guideway 1' until the gauge pin is opposite the cutting tool. The cutting tool is then adjusted against the outer end 35' of the gauge pin until the recording on the gauge is the same as that taken from the surface of the wrist-pin after which the gauge pin is removed and the clamping elements unlocked and moved apart.

Before the tail-stock 5 is moved up in contact with the spindle, the bearing of the piston is placed over the spindle and cutting tool, thereby placing the bearing between the cutting tool and the head. After the tail stock has been placed in supporting position for the outer end of the spindle, it is locked in place by the screw 5'.

Figure 8:
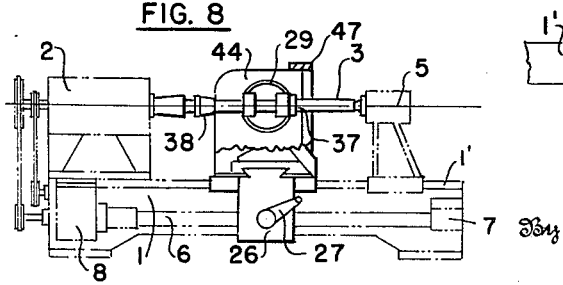
Figure 8 is a view showing schematically the position of the carriage at the beginning of the boring operation.
Figure 9:
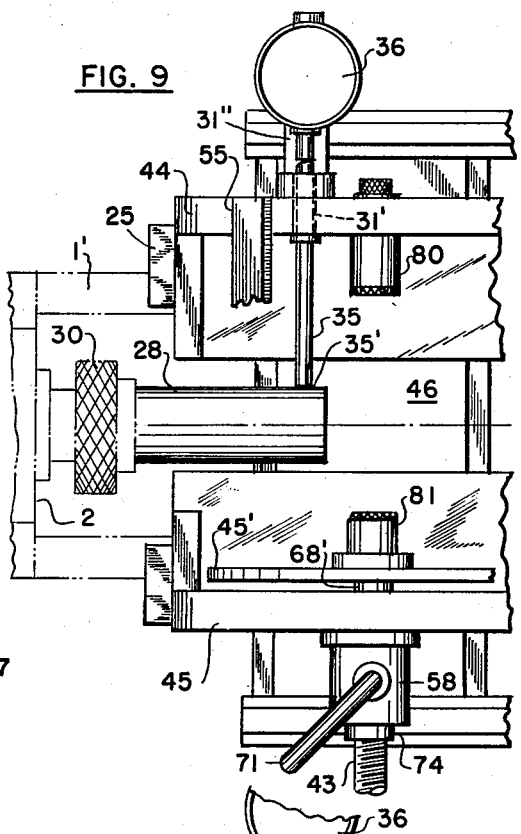
Figure 9 is an enlarged partial plan view of the measuring device in measuring the outside diameter of a wrist-pin as schematically shown in Figure 5.
Figure 10:
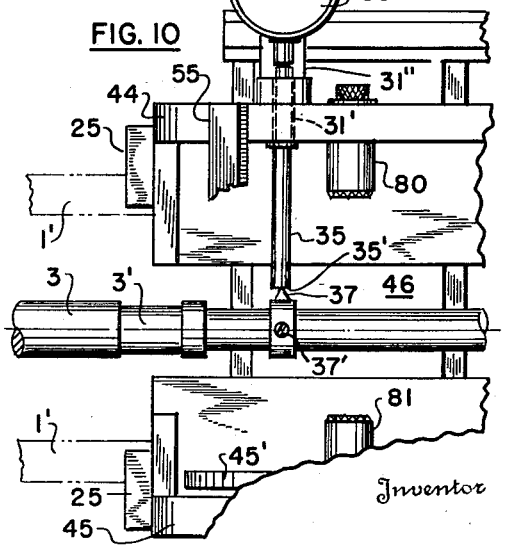
Figure 10 is an enlarged partial plan view illustrating the method used in setting of the cutting tool as shown in Figure 6.
Figure 11:
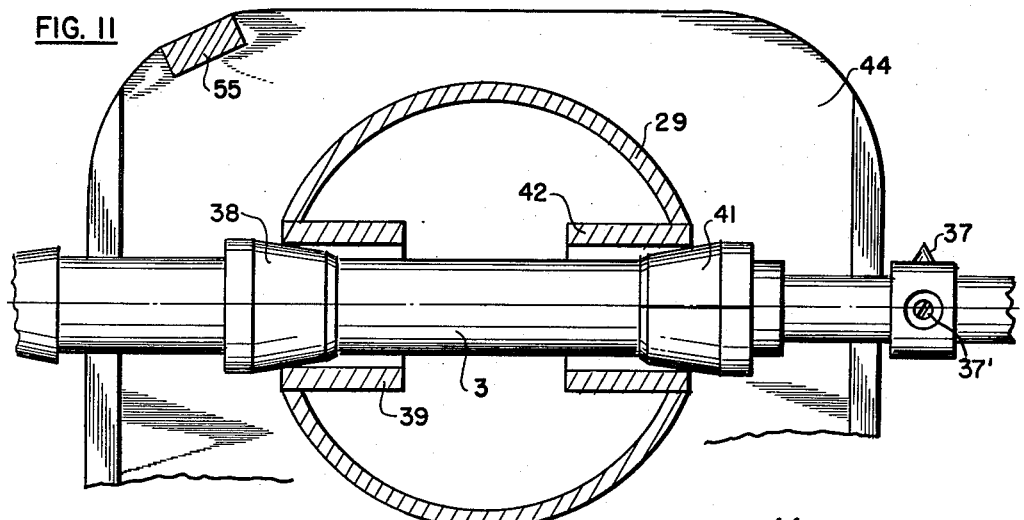
Figure 11 is an enlarged fragmentary sectional view in elevational of the tapered cones for centering the bearings with the axis of the rotating head as shown schematically in Figure 7.

It should be noted that at this time the work piece is not clamped within the clamping unit, but is loosely supported on the spindle 3 and is free to move about in a limited area defined by the size of the original size of the bearing and is now ready to be centered by the tapered cones 38 and 41. The split removable cone member 41 is first inserted into the recess 3' of the spindle 3, the detail structure of which will be referred to more fully hereinafter, and the bearing 42 is moved in contact therewith to make a relatively tight fit, as shown in Figure 11. At the same time the cone 38, which is slidably receivable over the spindle 3, is moved in contact with the bearing 39 until it is of substantially the same relative tightness as that between cone 41 and bearing 42. When the cone 38 is pressed into the bearing 39 the bearings will become centered on the spindle, which is also the axis of the rotating head 2. When the bearing carried by the work piece is centered the clamping unit is brought opposite the work for clamping the work in the position as defined by the centering cones. It should be noted that during the clamping of the work piece by the clamping elements, the clamping unit as a whole is free to move transversely of the carriage 25. When the work piece is securely clamped between the elements 44 and 45, they are locked to the carriage and the pivoted face 45' is locked in the position it has taken during the clamping operation of the work piece. The machine is now ready to perform the boring operation as illustrated in Figures 8 and 12.

Figure 2:
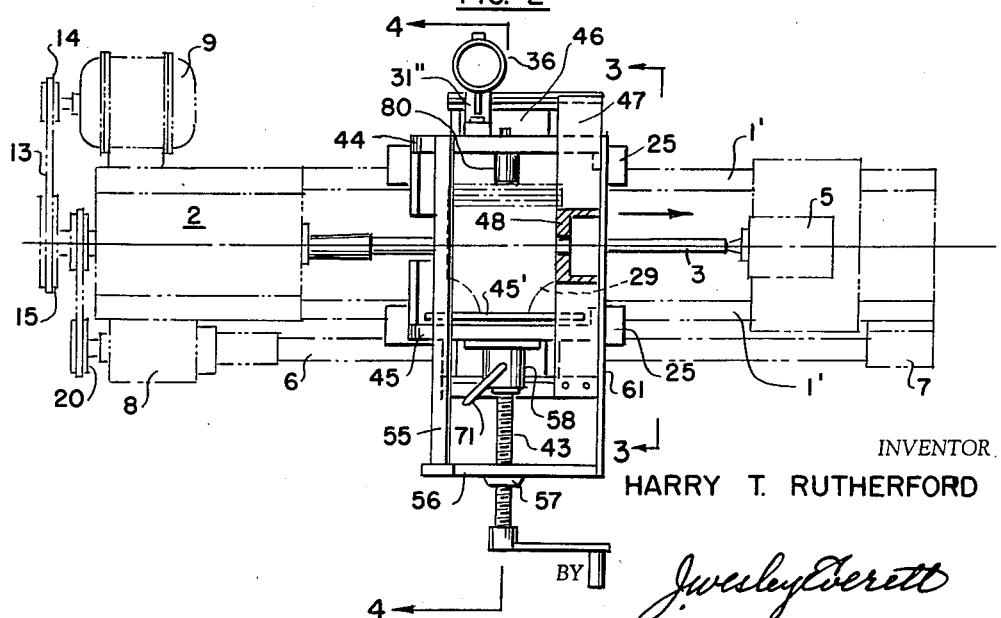
Figure 2 is a plan view of the same.
Figure 3:
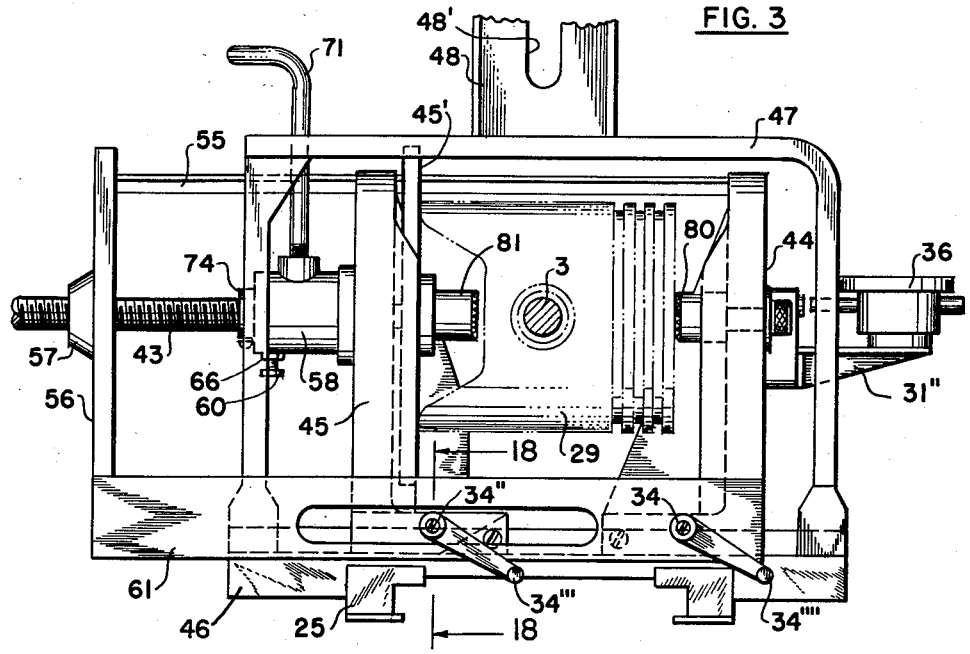
Figure 3 is an enlarged fragmentary elevational view of the work clamping unit taken along the line 3—3 of Figure 2.
Figure 4:
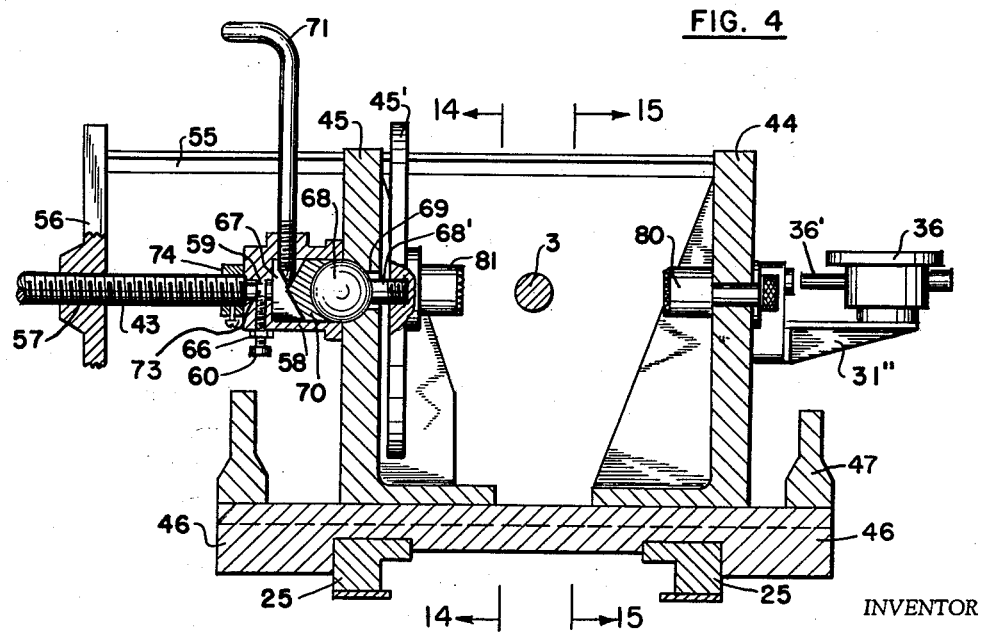
Figure 4 is an enlarged sectional view of the work clamping unit taken on line 4—4 of Figure 2.

By supplying electric current to the motor 9, the cutting tool 37 and feed screw 6 are put in operation. The carriage being in a position as illustrated in Figure 8 may now be moved automatically along the guideways 1' toward the tail-stock. The automatic feed is put in operation by moving the lever 27 to cause the screw engaging means on the carriage to engage the rotating feed screw 6. After the carriage has moved a sufficient distance in the direction of the arrow in Figures 1 and 2 to allow the cutting tool to pass through the bearings, the machine is stopped and the piston removed. The operation may be repeated to bore a number of piston bearings of a size to fit a particular size wrist-pin.

In boring the wrist pin bearing of the connecting rod, a similar operation is followed. In this case, however, only the piston pin bearing in the connecting rod is illustrated, as the larger bearing at the present time is very seldom bored. In boring the wrist-pin bearing in the connecting rod, reference is made in particular to Figure 13. The positioning cones as described and illustrated for centering the piston bearing are used in exactly the same manner for centering the bearing 50 in the connecting rod. In the beginning of the set up for the connecting rod, the larger end 49' of the connecting rod 49 is placed loosely over the expandable mandrel 51 which is adjustably supported within the slot 48' upon the member 48. When the bearing 50 has been centered by the cones as previously described, the clamping jaws are moved inwardly to clamp the connecting rod against any lateral movement and the adjustable mandrel 51 is adjusted within the slot 48' of the member 48 and tightened to support the connecting rod in the position defined by the cone members. The carriage is moved as described for boring the piston bearing, moving the tool through the bearing 50 in substantially the same manner as it passed through the bearings of the piston.

Figure 13:
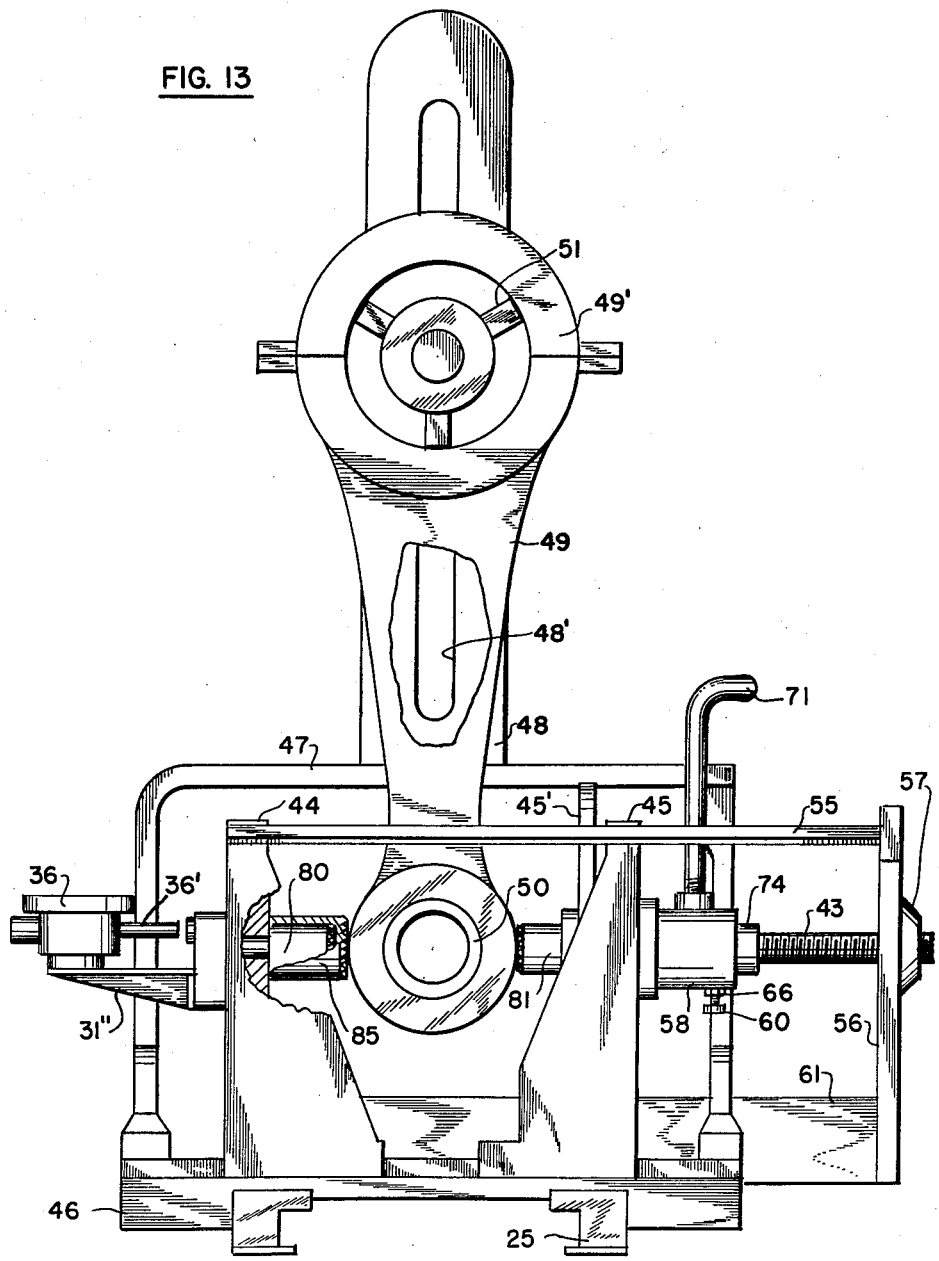
Figure 13 is an enlarged end elevational view of the clamping unit showing the position of the connecting rod when boring one of the connecting rod bearings.
Figure 14:
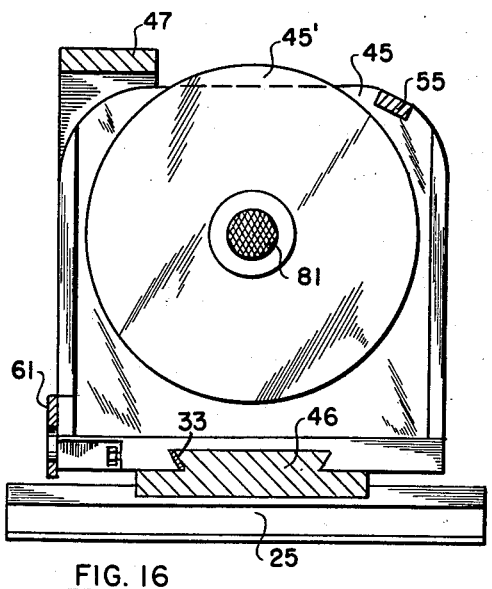
Figure 14 is a sectional view taken on line 14—14 of Figure 4.
Figure 15:
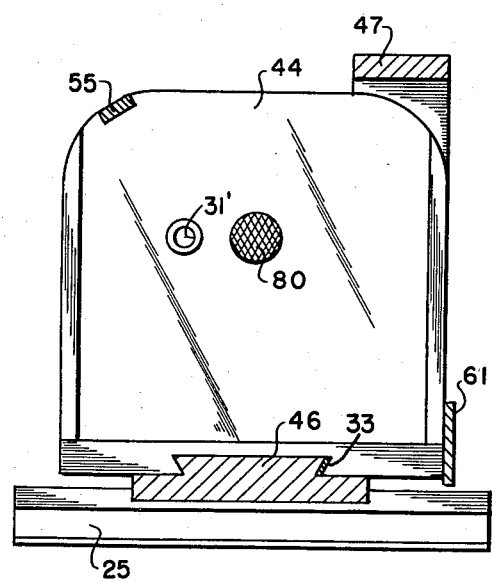
Figure 15 is a sectional elevational of line 15—15 of Figure 4.

It is sometimes desirable to extend the members 80 and 81, and for this purpose an extension 85 is provided to fit over either of the two members 80 and 81. One of these extensions is shown in Figure 13 for extending the member 80.

The removable split centering cone is particularly illustrated in Figures 16 and 17. The cone is substantially in two equal sections 41' and 41''. Each half of the cone is provided with a handle 90 and 91. Extending between the handles is a hinge formed by the members 92 and 95. The halves of the cones are kept in contact by an expansion spring 96. The cone portions are normally held in closed position by the action of the spring. By pressing together the outer ends of the handle the halves are separated to such an extent as to allow the two halves to be placed over the portion 3' of the spindle 3, where they will again close about the spindle when the handles are released.

While a preferred form of the invention has been illustrated and described in detail, it is not intended that the invention be limited to the specific structure set forth herein as other modifications will become apparent to those skilled in the art. Therefore, the scope of the invention is best defined in the appended claims.

I claim:

1. A boring machine for work pieces carrying cylindrical hollow bearings comprising, in combination, a supporting base having a longitudinal guideway, a rotatable driving head including a supporting shaft for the head rotatably supporting the head on the base in an off-set position at one end of the guideway having its rotating axis parallel with the said guideway, a tool carrying spindle adapted to have one end supported by the driving head, an adjustable tool carried by said spindle adjustable perpendicular to the elongated axis of the spindle, a bearing support for the opposite end of the spindle carried outwardly from the rotatable head, a carriage movable along the said guideway parallel with the line extending through the axis of the driving head and the outer end bearing support supporting for the opposite end of the spindle, a clamping unit carried by the carriage having a pair of clamping elements including clamping faces oppositely disposed one on each side of the tool carrying spindle and adjustable relative to the axis of the spindle, means for aligning the bearings carried by the work piece with the axis of the spindle, means for adjusting the clamping elements relative to each other independently of the carriage for clamping the work piece in the position defined by the aligning means and means for locking the clamping unit to the carriage, at least one face of one of the clamping elements being pivotably supported thereon having means for fixing the relative position of the face on the clamping element in a limited selected position.

2. A boring machine for work pieces carrying cylindrical hollow bearings comprising, in combination, a supporting base having a longitudinal guideway, a rotatable driving head including a supporting shaft for the head rotably supporting the head on the base in an off-set position at one end of the guideway having its rotating axis parallel with the said guideway, a tool carrying spindle adapted to have one end supported by the driving head, an adjustable tool carried by said spindle adjustable perpendicular to the elongated axis of the spindle, a bearing support for the opposite end of the spindle carried outwardly from the rotatable head, a carriage movable along the said guideway parallel with the line extending through the axis of the driving head and the outer end bearing support supporting for the opposite end of the spindle, a clamping unit carried by the carriage having a pair of clamping elements including clamping faces oppositely disposed one on each side of the tool carrying spindle and adjustable relative to the axis of the spindle, means for aligning the bearings carried by the work piece with the axis of the spindle, means for adjusting the clamping elements relative to each other independently of the carriage for clamping the work piece in the position defined by the aligning means and means for locking the clamping unit to the carriage, the aligning means comprises a pair of cones one of which is provided with an opening adapted to be slidable along the spindle adjacent the end of the spindle being held by the rotatable head, the other cone being split and having an opening of smaller size than the first mentioned cone adapted to engage a recess formed in the spindle whereby the split cone may be readily held in position on the spindle and removed from the spindle without removing the spindle from the rotatable head, or the support from its opposite end.

3. A boring machine for work pieces carrying cylindrical hollow bearings comprising, in combination, a supporting base having a longitudinal guideway, a rotatable driving head including a supporting shaft for the head rotatably supporting the head on the base in an off-set position at one end of the guideway having its rotaing axis parallel with the said guideway, a tool carrying spindle adapted to have one end supported by the driving head, an adjustable tool carried by said spindle adjustable perpendicular to the elongated axis of the spindle, a bearing support for the opposite end of the spindle carried outwardly from the rotatable head, a carriage movable along the said guideway parallel with the line extending through the axis of the driving head and the outer end bearing support supporting for the opposite end of the spindle, a clamping unit carried by the carriage having a pair of clamping elements including clamping faces oppositely disposed one on each side of the tool carrying spindle and adjustable relative to the axis of the spindle, means for aligning the bearings carried by the work piece with the axis of the spindle, means for adjusting the clamping elements relative to each other independently of the carriage for clamping the work piece in the position defined by the aligning means and means for locking the clamping unit to the carriage, the clamping unit including a pair of clamping jaws positioned generally in a vertical plane parallel with the spindle axis, one of said jaws being pivotly supported for conforming to the work piece and means for fixing the pivotable jaw in selected position.

References Cited in the file of this patent

UNITED STATES PATENTS

| | | |
|---|---|---|
| 1,512,999 | Muehlberg | Oct. 28, 1924 |
| 1,565,709 | Burgh | Dec. 15, 1925 |
| 1,751,708 | Neller | Mar. 25, 1930 |
| 1,887,379 | Orr | Nov. 8, 1932 |
| 2,218,380 | Evans | Oct. 15, 1940 |
| 2,584,005 | Evans | Jan. 29, 1952 |

FOREIGN PATENTS

| | | |
|---|---|---|
| 138,319 | Australia | Aug. 14, 1950 |